Jan. 20, 1953  W. E. SACHSE  2,626,121
AUTOMATIC FILLING SCALE
Filed March 13, 1948
FIG. 2.
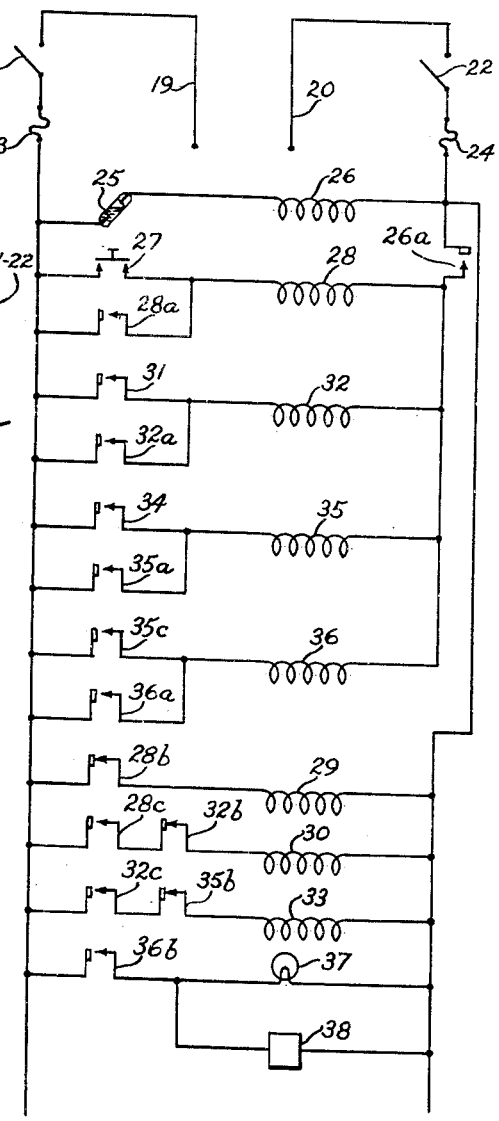
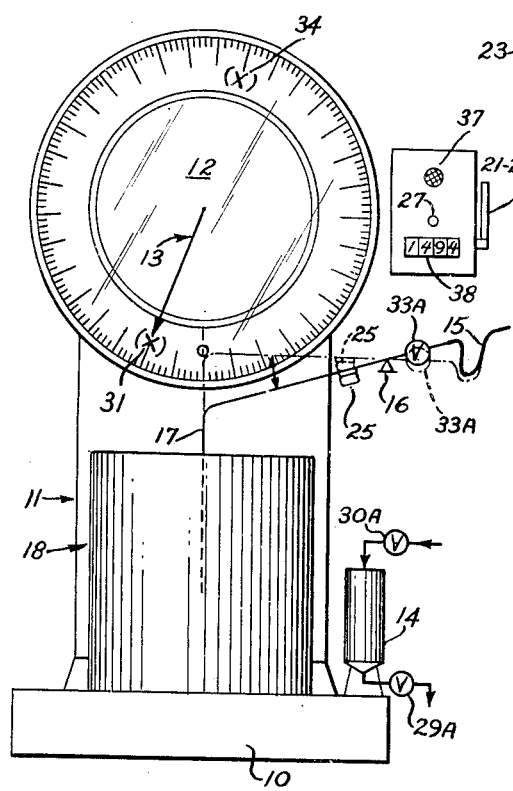
FIG. 1.
INVENTOR.
WILLIAM E. SACHSE.
BY Campbell, Brumbaugh & Free
his ATTORNEYS.

Patented Jan. 20, 1953

2,626,121

UNITED STATES PATENT OFFICE 2,626,121

AUTOMATIC FILLING SCALE

William Eyler Sachse, Euclid, Ohio, assignor to The Standard Oil Company, Cleveland, Ohio, a corporation of Ohio Application March 13, 1948, Serial No. 14,742

1 Claim. (Cl. 249—60)

The present invention relates to scales and more particularly to an automatic scale which provides a convenient and practical means for filling containers of different weight with a definite predetermined weight of material.

According to current practice, the distribution of a material in equal amounts creates a rather difficult operation, especially when the empty containers are nonuniform in weight, such as is the case with the common steel barrels used for the transportation of oil products and the like. The operation is subject to considerable error, a high accounting cost, and subsequent inaccuracies during the inventory period.

It is the purpose of this invention to provide a new and improved means for dispensing equal quantities of a material into variable weight containers by using an automatic, electrically controlled, compensating and filling system.

More particularly the invention comprises a scale with a compensating tank, the weight of which is automatically adjusted to compensate for variations in the weight of containers, so that the filling of the container to a given total weight for the container and contents will give a predetermined and uniform weight for the contents irrespective of variations in the weight of the container.

Other features of the invention reside in the novel construction and arrangement of parts hereinafter described and particularly pointed out in the appended claim.

The apparatus may be more clearly understood from the following detailed description, taken in conjunction with the accompanying drawings, in which:

Figure 1 is a view in front elevation of an automatic scale constructed according to the invention; and Figure 2 is a diagrammatical representation of an electrically operated control circuit suitable for use in combination with the present invention.

Referring to the drawings and first to Figure 1, the apparatus consists of a standard automatic springless platform type scale, whose principal parts include the platform 10, the frame 11, a scale dial 12 and a pointer 13 which moves in accordance with the total weight on the platform 10. The scale dial 12 houses two electrical contacts, 31 and 34, which may be positioned at various points on the scale dial and which are closed by movement of the pointer 13. Contact 31 is set at a predetermined value greater than the weight of any container to be used for a particular operation, and contact 34 is so set that the difference between it and contact 31 represents the desired weight of material to be put in container 18.

Located on the scale platform 10 is a compensating tank 14 into which water or any other desirable material may be introduced from an outside source. In the case of water or other liquids the flow is controlled by drain or outlet valve 29A and flow or inlet valve 30A. The material to be inserted into the container 18 moves from a storage area to the apparatus by means of a hose or conveyor 15 which connects to a filling tube 17, shown in full lines in filling position and by dotted lines in non-filling position. Attached to the filling tube on either side of pivot 16 is mercury tube type switch 25 and material inlet valve 33A. Associated with the scale is a control box comprising a starting button 27, an indicating lamp 37 and a self recording counter 38, which is to be more particularly described hereinafter.

Figure 2 illustrates the control circuit in a steady state or normal non-operating condition. From the electrical source two power lines 19 and 20 pass through a circuit breaker composed of knife switches 21 and 22, and fuses 23 and 24. The circuit includes relay coils 26, 28, 32, 35 and 36 with their respective contacts designated by lower case letters, i. e., 26a, 35a, 35b, etc.

In a typical operation, an empty container 18 is placed on scale platform 10 and filling tube 17 placed therein. As a result of lowering the tube about the pivot 16, the mercury tube type switch 25 closes contact, thereby energizing relay coil 26. Contact 26a closes, preparing the electrical circuit between power line 20 and relay coils 28, 32, 35 and 36.

When the operator presses the start button 27, the electrical circuit to relay coil 28 is completed. As a result contact 28a closes and electrically locks in relay coil 28; 28b, a normally closed contact, opens and deenergizes coil 29, closing drain valve 29A. Coil 29 is normally energized whenever the switch 21—22 is closed so as to normally maintain drain valve 29A open. Contact 28c closes the electrical circuit between power line 19 and energizes the coil 30 of valve 30A through the normally closed contact 32b. The energization of the coil 30 opens valve 30A, thereby allowing the compensating liquid to flow into compensating tank 14. The flow continues until the weight of the compensating liquid reaches the point at which the container weight adjustment is set, at which time contact 31 closes and the electrical circuit to relay coil 32 is completed.

Contact 32a closes and electrically locks in relay coil 32. Contact 32b, which normally is in a closed position, opens the electrical circuit between power line 19 and coil 30 and the compensating inlet valve 30A closes, thereby stopping the flow of the compensating liquid. Contact 32c closes the electrical circuit between power line 19 and energizes the coil 33 of valve 33A through the closed contact 35b. Material inlet valve 33A opens, thereby permitting the passage of the desired material into container 18.

Contact 34 closes when the pointer 13 reaches the contact located at the desired filling weight in the scale dial. The electrical circuit to relay coil 35 is therefore completed. Contact 35a closes and electrically locks in relay coil 35. Contact 35b opens the electrical circuit between power line 19 and the coil 33 of material inlet valve 33A, thereby closing said valve 33A and stopping the material flow. Contact 35c closes and completes the electrical circuit to relay coil 36. Contact 36a closes and electrically locks in relay coil 36. Contact 36b closes and completes the electrical circuit to lamp 37 and counter 38. The full container signal lamp 37 begins to burn at the same time the material inlet valve 33A is closed.

When the operator raises the filling tube 17 from the container 18, by moving it about pivot 16, mercury tube type switch 25 opens, thereby deenergizing relay coil 26. Contact 26a opens and disconnects power line 20 from relay coils 28, 32, 35 and 36. When contact 28b completes the electrical circuit between power lines 19 and 20, coil 29 is energized and drain valve 29A opens, in this manner allowing the compensating liquid to flow to a sewage outlet. Contact 36b opens when relay coil 36 is deenergized, at which time lamp 37 discontinues burning and counter 38 is deenergized. The system is then ready to start another operation.

From the foregoing, it should be apparent that this apparatus provides a simple and highly effective method for automatically filling containers with a uniform quantity of material.

In addition, means are provided whereby an adjustment may be made to compensate for the variations of specific gravity of different materials. As a precautionary measure in case of a power failure, the electric circuit has been designed so as to prevent the opening of any control valves.

The modification described above is intended to be illustrative only and the invention is not intended to be limited in any way thereby but is susceptible of numerous changes in form and detail within the scope of the following claim.

I claim:

A weighing scale comprising a platform adapted to receive containers having variable weight into which a uniform amount of a product is to be placed, a compensating weight tank carried by said platform, means movable between operative and inoperative positions for dispensing the product into the container, a first switch responsive to movement of said means to the operative position, first electrically controlled means responsive to actuation of said first switch for automatically introducing any desirable compensating material into said compensating weight tank, second and third switches connected to be actuated by said scale when a predetermined lower weight level is carried thereby, second electrically controlled means responsive to actuation of the second switch for terminating the flow of compensating material whereby the weight of said compensating material and said compensating weight tank in combination with the weight of the container attains a predetermined lower weight level greater than the weight of any given container, third electrically controlled means responsive to actuation of the said third switch for automatically introducing any desirable product into said container, a fourth switch connected to be actuated by the scale when a predetermined upper weight level is carried thereby for terminating the flow of the product into the container whereby when a predetermined upper weight level is attained the difference between said upper and said lower weight level is a fixed amount.

WILLIAM EYLER SACHSE.

REFERENCES CITED

The following references are of record in the file of this patent:

UNITED STATES PATENTS

| Number | Name | Date |
| --- | --- | --- |
| 1,402,934 | Hoepner | Jan. 10, 1922 |
| 1,640,073 | Hapgood | Aug. 23, 1927 |
| 2,044,017 | Robb | June 16, 1936 |
| 2,067,743 | Weckerly | Jan. 12, 1937 |
| 2,332,438 | Clifford | Oct. 19, 1943 |
| 2,541,915 | Culver | Feb. 13, 1951 |

FOREIGN PATENTS

| Number | Country | Date |
| --- | --- | --- |
| 209,897 | Great Britain | Jan. 24, 1924 |
| 431,805 | Great Britain | July 16, 1935 |